Dec. 19, 1950  CARL-ERIK GRANQVIST  2,534,711
RADIO DIRECTION FINDER

Filed Jan. 22, 1945  2 Sheets-Sheet 2

INVENTOR
CARL-ERIK GRANQVIST
BY
ATTORNEY

Patented Dec. 19, 1950

2,534,711

UNITED STATES PATENT OFFICE 2,534,711

RADIO DIRECTION FINDER

Carl-Erik Granqvist, Lidingo, Sweden, assignor to Svenska Aktiebolaget Gasaccumulator, Lidingo, Sweden, a corporation of Sweden Application January 22, 1945, Serial No. 573,916
In Sweden January 4, 1944

Section 1, Public Law 690, August 8, 1946
Patent expires January 4, 1964

5 Claims. (Cl. 343—121)

This invention relates to radio direction finders and more particularly to radio direction finders involving phase angle measurements.

Cathode ray oscilloscopes have heretofore been proposed for measuring the phase angles in devices of the above type. In such devices one of the currents is fed to the deflection electrodes of the cathode ray oscilloscope in the form of at least two oscillations mutually displaced in phase to produce a rotating field. The other current is fed to a control electrode in the form of a sharply peaked voltage wave in a predetermined phase position which is a function of the phase angle to be measured, so that the rotating energy field produces an indication of the phase angle at the moment the peaked energy pulse is applied.

In previous arrangements the sharply peaked voltage is applied to a control grid which is so biased that a light spot is produced on the screen only when the peaked energy is applied. Therefore, the position of the light point on the screen is dependent on the phase angle to be measured.

However, it is difficult to read the phase angle rapidly and easily when only one point is available. As a matter of fact, the human eye is accustomed to reading a point, such as the tip of a pointer, in relation to a scale. Of course, a scale can be drawn on the screen of the cathode ray oscilloscope, but the position of the light point with respect to the scale would depend on the value of the main voltage, so that even if the reading is made easier by the presence of the scale, it will not be an ideal condition.

An object of the present invention is to provide an improvement on the above mentioned system. According to the present invention, the sharply peaked voltage is not fed to a control grid of the cathode ray oscilloscope, but instead is supplied to the deflection electrodes in such a way as to momentarily change the radius of the arc of the light spot produced by the rotating field. For example, the deflection voltages which produce the rotating field are intermittently varied at the moment of maximum control voltage. If the voltages are caused to increase the circular picture appearing on the screen and normally having a given radius will be intermittently changed to a greater radius at the indicated position.

In another embodiment, the voltages supplied to the deflection electrodes may be unchanged, but the control voltage, the phase of which is to be measured, may be supplied to the accelerating electrodes in such a way as to vary the speed of movement of the electrons. If the speed of movement of the electrons is decreased, for example, the deflection caused by a predetermined voltage on the deflection electrodes will increase, thereby producing a change in the circular path of the light spot on the screen. In this way an indication is obtained which corresponds to a large degree to the normal image of a pointer moving over a scale and may therefore be easily read with good precision.

Of course, in this case also the radius of the circle may vary somewhat with variations in the supplied voltage and it is necessary to arrange a fixed scale on the screen in order to facilitate accurate reading. The scale, however, will be concentric with the circle produced by the cathode ray and this concentricity enables the reader to transpose the indication rapidly in a radial direction.

The invention is further described below in connection with the accompanying drawing in which.

Figure 1:
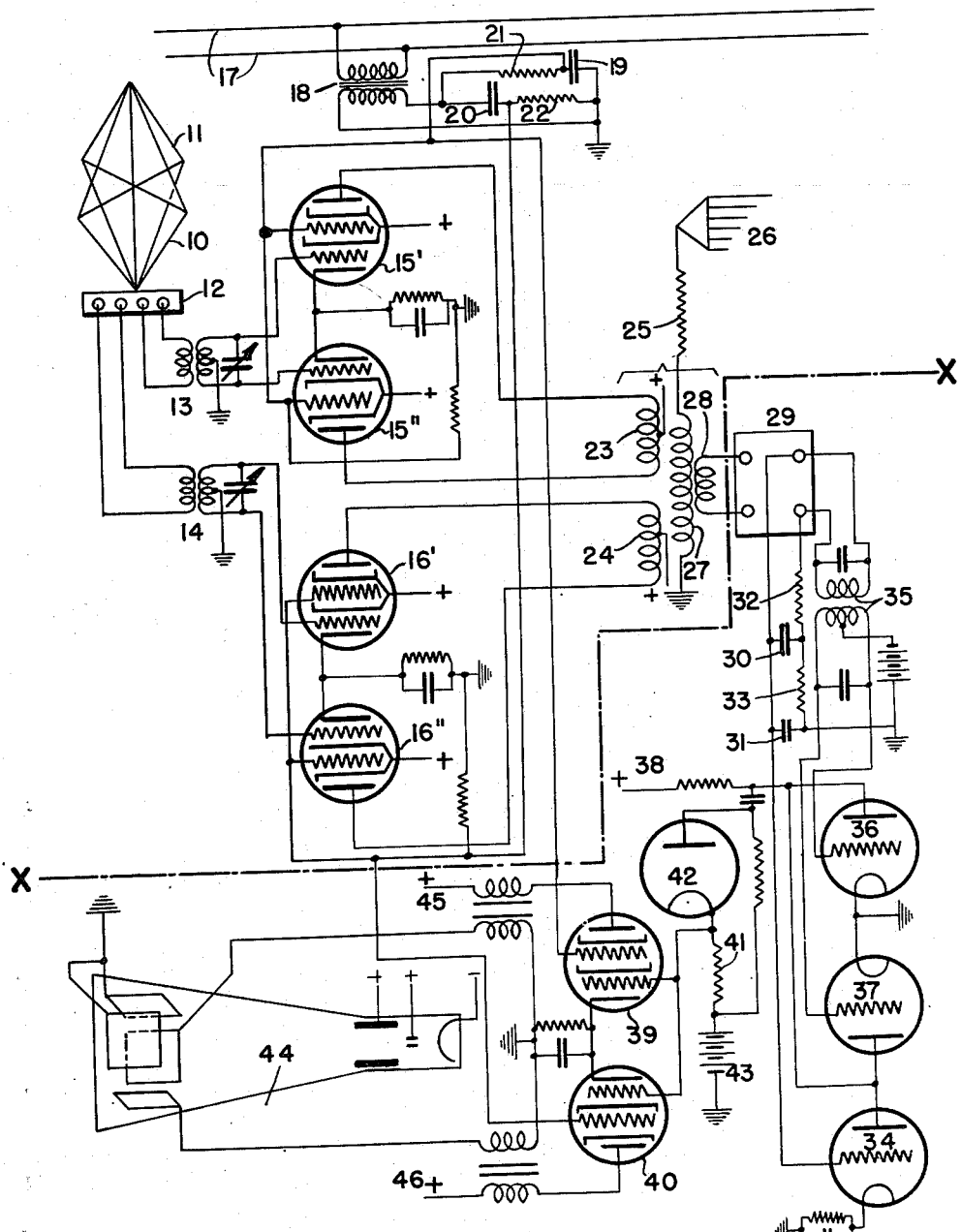
Fig. 1 is a schematic diagram of a radio direction finding system embodying the present invention.

Referring first to Fig. 1, two loop antennas 10 and 11 are connected respectively by means of a terminal block 12 to the primary windings of tuned transformers 13 and 14. The secondaries of these transformers are connected to the first control grids of tubes 15' and 15" and tubes 16' and 16" respectively of balanced modulators. The second control grids of these tubes are connected to a source of alternating voltage such as power mains 17 which may, for example, carry 50 cycle current. This connection is shown as made by means of a transformer 18 and a 90° phase shifting network containing condensers 19 and 20 and resistors 21 and 22. The common point between the condenser 19 and resistor 21 is shown as connected to the second control grids of the tubes 15' and 15" and the common point between the condenser 20 and the resistor 22 is shown as connected to the second control grids of tubes 16' and 16". The anode circuits of the respective tubes are connected in push-pull relationship to primaries 23 and 24 of a transformer 25 having an additional primary winding 27 to which an antenna 26 is connected. The secondary 28 of the transformer 25 is connected to an amplifier 29.

One output channel of the amplifier 29 includes a 90° phase shifting network, comprising condensers 30 and 31 and resistors 32 and 33. The voltage from this network is fed to the control grid of a space discharge tube 34. A second output channel from the amplifier 29 includes an output transformer 35 and two triode-rectifier valves 36 and 37. The valves 34, 36 and 37 are provided with anodes which are supplied through a common anode resistor 38 across the terminals of which a voltage of sharply peaked maximum is formed.

In the above arrangement, two voltages mutually displaced in phase by 90° may be obtained from the filter network 19—22. These voltages are transferred to the deflection electrodes of the cathode ray oscilloscope by two modulator tubes 39 and 40, preferably arranged for amplification, which are also fed with a voltage from a load resistor 41 connected in the circuit of a diode rectifier 42. The rectifier 42 is supplied by the voltage developed across the resistor 38 which is of sharply peaked wave form, and is so biased by a battery 43 that current flows through the rectifier 42 only during a very short interval when the sharply peaked wave is of maximum value. The tubes 39 and 40 are also supplied from the filter network 19—22 with voltages which are mutually displaced in phase by 90°. The output electrodes of the tubes 39 and 40 are connected to the deflection electrodes of the cathode ray oscilloscope 44 by means of transformers 45 and 46. The cathode ray oscilloscope is not necessarily provided with a control grid.

The above described system operates in the following way. In a known manner a field is produced in the coils 23 and 24 which corresponds to the field which would have been obtained if the antenna loops 10 and 11 were rotated in space at a speed equal to the frequency of the main 17. This field is combined with the voltage from the non-directional antenna 26, is amplified and rectified and supplied to the tubes 34, 36 and 37 to develop a voltage across the resistor 38 having a sharply peaked wave form. This voltage will have the same frequency as that of the main 17. The amplified oscillations from the tubes 39 and 40 produce a rotating field in the cathode ray oscilloscope 44 which causes the cathode ray to form a circle on the cathode ray oscilloscope screen. When the voltage across the resistor 38 momentarily exceeds the bias from the source 43, the modulator tubes 39 and 40 are momentarily pulsed to cause either an increase or decrease in the anode current. In the embodiment shown in Fig. 1 the anode currents are assumed to increase and will thereby produce a momentary increase in the radius of the cathode ray arc on the screen of the oscilloscope 44 as indicated in Fig. 2.

Figure 2:
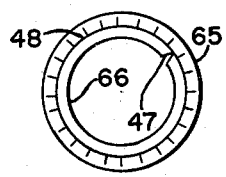
Fig. 2 is a detail view of the cathode ray oscilloscope screen.

Fig. 2 illustrates the appearance of the cathode ray screen. The screen is shown at 65 and the circular path of the cathode ray is shown at 66. The time and pulse of the rectifier 42 suddenly increase the diameter of the circle as indicated at 47. A scale 48 is arranged on the screen to provide an indication of the direction of the received wave.

The deflection characteristics of the cathode ray oscilloscope are determined not only by the voltage on the deflection electrodes, but also by the speed of the electrons as they pass through the deflection field. Hence the same effect may be obtained by pulsing one or more of the electrodes of the cathode ray oscilloscope that determine the speed of the electrons. If the speed is decreased the effect of the rotating field will be increased and the diameter of the circular sweep of the cathode ray will also increase.

Figure 3:
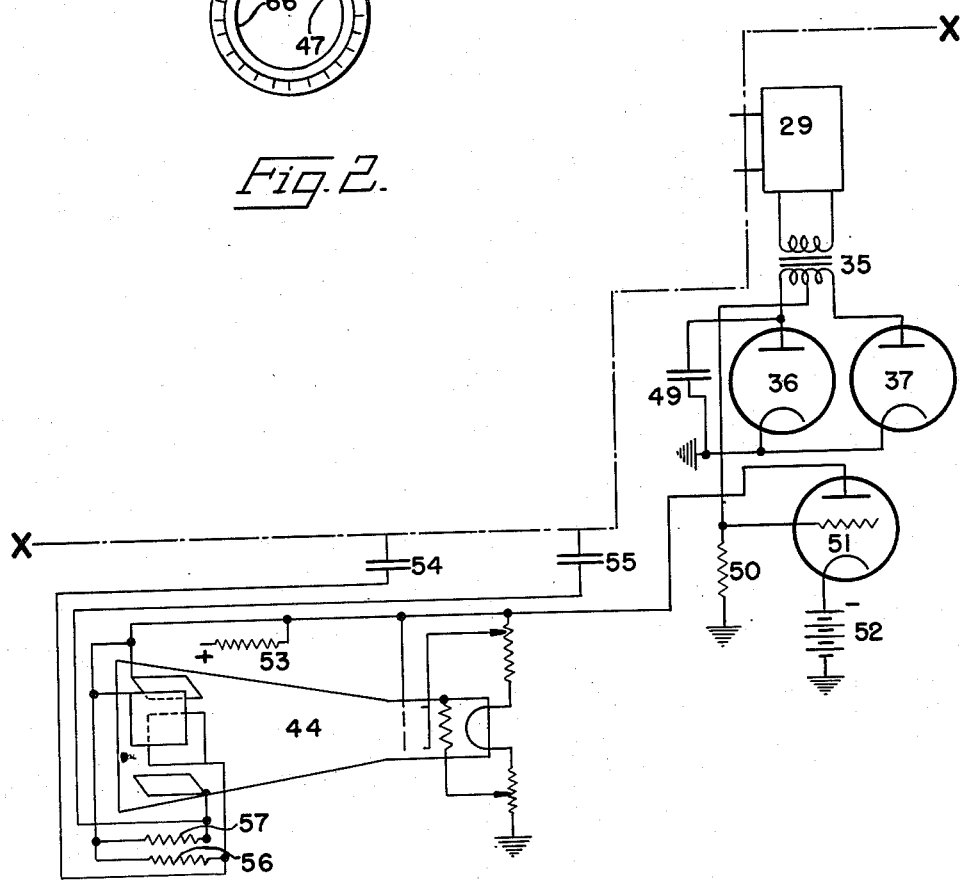
Fig. 3 is a partial schematic diagram illustrating a further embodiment of the invention.

An embodiment in which this effect is utilized and which is in other respects somewhat simpler than the arrangement shown in Fig. 1 is illustrated in Fig. 3. In Fig. 3 the elements to the left of the line $x$—$x$ of Fig. 1 which constitute the input to the amplifier 29 are identical with those of Fig. 1 and have not been repeated.

As in the arrangement above described, the output terminals of the amplifier 29 are connected to a transformer 35, the secondary of which is provided with a mid-point tap. The terminals of the secondary are connected to two rectifiers 36 and 37.

In place of the electronic tube 34 of Fig. 1 and the phase shifting network, the circuit of Fig. 3 provides a condenser 49 across the electronic path of one of the rectifier tubes 36 and 37. Of course this simplified arrangement does not produce the same marked maximum value as in the arrangement of Fig. 1, but the maximum value is usually sufficient for practical purposes.

The mid-point of the secondary of the transformer 35 is connected to ground through a resistor 50 and the high voltage terminal of the resistor 50 is connected to the control grid of a triode rectifier tube 51 which is so biased from a source 52 that anode current passes only during periods of maximum grid voltage or in the immediate vicinity thereof. The anode current of the tube 51 passes through a series resistor 53 from which all of the electrode voltages of the cathode ray oscilloscope are derived, all of the voltages thus being momentarily decreased when current passes through the tube 51. This causes an immediate and momentary decrease in the speed of the electrons in the cathode ray oscilloscope and consequently increases the control effect of the deflection electrodes.

The rotating field is obtained by feeding the deflection electrodes through condensers 54 and 55 with voltages which are displaced in phase by 90° and are derived from the phase displacing network 19 to 22 shown in Fig. 1. Protector resistors 56 and 57 are shown as connected in the bias circuits of the deflection electrodes to prevent short circuiting of the alternating voltages supplied thereto.

What is claimed:

1. A radio direction finding system, comprising a source of alternating voltage, phase splitting means to derive from said alternating voltage a pair of alternating voltages of the same frequency but displaced in phase by 90°, a cathode ray oscilloscope having means producing a cathode ray of substantially uniform intensity and having deflecting electrodes, circuit means to supply said derived voltages to said deflecting electrodes in a sense to cause the cathode ray to trace a circular pattern, a loop antenna, means for deriving a second alternating voltage of the frequency received by the loop antenna, means for electrically combining said first and said second alternating voltages so as to form pulses of peaked wave form, and means for supplying said peaked pulses to control electrodes of said oscilloscope so as to produce a radial deflection in said circular pattern at a point corresponding to the input direction of the radio wave to said loop antenna.

2. A radio direction finding system, comprising a source of alternating voltage, phase splitting means connected to derive from said alternating voltage a pair of alternating voltages of the same frequency but displaced in phase by 90°, a cathode ray oscilloscope having means producing a cathode ray of substantially uniform intensity and having deflecting electrodes, circuit means including a pair of space discharge tubes connected to supply said derived voltages to said deflecting electrodes in a sense to cause the cathode ray to trace a circular pattern, a loop antenna, means for deriving a second alternating voltage of the frequency received by said loop antenna, means for electrically combining said first and said second alternating voltages so as to form pulses of peaked wave form, and means supplying said peaked pulses to modulate the operation of said space discharge tubes so as to produce a radial deflection in said circular pattern at a point corresponding to the input direction of the wave received by said loop antenna.

3. A radio direction finding system, comprising a source of alternating voltage, phase splitting means connected to derive from said alternating voltage a pair of alternating voltages of the same frequency but displaced in phase by 90°, a cathode ray oscilloscope having means producing a cathode ray of substantially uniform intensity and having deflecting electrodes, circuit means including a pair of multi-grid space discharge tubes connected to supply control voltages to said deflecting electrodes, a loop antenna, means for deriving a second alternating voltage of the frequency received by said loop antenna, means for electrically combining said first and said second alternating voltages so as to form pulses of peaked wave form, means supplying said derived voltages to one of said grids of each tube and means supplying said pulses of peaked wave form to another grid of each tube to cause the cathode ray to trace a circular pattern having a radial deflection therein at a point corresponding to the input direction of the wave received by said loop antenna.

4. A radio direction finding system, comprising a source of alternating voltage, phase splitting means connected to derive from said alternating voltage a pair of alternating voltages of the same frequency but displaced in phase by 90°, a cathode ray oscilloscope having means producing a cathode ray of substantially uniform intensity and having deflecting electrodes, circuit means including a pair of space discharge tubes connected to supply said derived voltages to said deflecting electrodes in a sense to cause the cathode ray to trace a circular pattern, a loop antenna, means for deriving a second alternating voltage of the frequency received by said loop antenna, means for electrically combining said first and said second alternating voltages, a rectifier tube, means biasing said rectifier tube to pass current only in the peaked areas of said combined voltage, and means responsive to the current pulses thus produced in said rectifier tube to control the operation of said oscilloscope so as to produce a radial deflection in said circular pattern at a point corresponding to the direction of the waves received by said loop antenna.

5. A radio direction finding system, comprising a source of alternating voltage, a cathode ray oscilloscope having means producing a cathode ray of substantially uniform intensity and having deflecting electrodes and at least one accelerating electrode, phase splitting means connected to derive from said alternating voltage a pair of alternating voltages of the same frequency but displaced in phase by 90°, circuit means connected to supply said derived voltages to said deflection electrodes in a sense to cause the cathode ray to trace a circular pattern, a loop antenna, means for deriving a second alternating voltage of a frequency received by said loop antenna, means for electrically combining said first and said second voltages so as to form pulses of a peaked wave form, and means supplying said peaked voltage to said accelerating electrode in a sense to decrease the speed of movement of the electrons in the cathode ray so as to produce a radial deflection in said circular pattern at a point corresponding to the direction of the waves received by said loop antenna.

CARL-ERIK GRANQVIST.

REFERENCES CITED

The following references are of record in the file of this patent:

UNITED STATES PATENTS

| Number | Name | Date |
|---|---|---|
| 1,768,262 | Marrison | June 24, 1930 |
| 1,924,156 | Hart | Aug. 29, 1933 |
| 2,092,081 | McLennan | Sept. 7, 1937 |
| 2,151,917 | Hyland | Mar. 28, 1939 |
| 2,172,395 | McSpadden | Sept. 12, 1939 |
| 2,233,275 | Wolff | Feb. 25, 1941 |
| 2,233,751 | Seeley | Mar. 4, 1941 |
| 2,263,377 | Busignies et al. | Nov. 18, 1941 |
| 2,285,038 | Loughlin | June 2, 1942 |
| 2,305,614 | Goldstein | Dec. 22, 1942 |
| 2,313,699 | Roberts | Mar. 9, 1943 |
| 2,334,247 | Busignies | Nov. 16, 1943 |
| 2,367,925 | Brown | Jan. 23, 1945 |
| 2,374,817 | Hardy | May 1, 1945 |
| 2,408,039 | Busignies | Sept. 24, 1946 |